United States Patent
Woelk et al.

(10) Patent No.: US 8,722,009 B2
(45) Date of Patent: May 13, 2014

(54) NANOCRYSTALLINE COPPER OXIDE AND METHOD FOR THE PRODUCTION THEREOF

(71) Applicant: Sued-Chemie IP GmbH & Co. KG, Munich (DE)

(72) Inventors: Hans-Joerg Woelk, Rosenheim (DE); Alfred Hagemeyer, Bad Aibling (DE); Frank Grossmann, Munich (DE); Oliver Wegner, Bruckmuehl (DE)

(73) Assignee: Sued-Chemie IP GmbH & Co. KG, Munich (DE)

( * ) Notice: Subject to any disclaimer, the term of this patent is extended or adjusted under 35 U.S.C. 154(b) by 0 days.

(21) Appl. No.: 13/924,144

(22) Filed: Jun. 21, 2013

(65) Prior Publication Data

US 2013/0281287 A1 Oct. 24, 2013

Related U.S. Application Data

(62) Division of application No. 12/995,251, filed as application No. PCT/EP2009/003883 on May 29, 2009, now abandoned.

(30) Foreign Application Priority Data

May 30, 2008 (DE) .................... 10 2008 026 210

(51) Int. Cl.
*C01G 3/02* (2006.01)
*C01G 5/00* (2006.01)
*C01G 7/00* (2006.01)

(52) U.S. Cl.
USPC ............ 423/604; 977/700; 977/773; 977/811

(58) Field of Classification Search
USPC .......................................... 423/604
See application file for complete search history.

(56) References Cited

U.S. PATENT DOCUMENTS

| 798,216 | A | 8/1905 | Scharff et al. |
|---|---|---|---|
| 7,211,236 | B2 | 5/2007 | Stark et al. |
| 2003/0077219 | A1* | 4/2003 | Ploss et al. ............. 423/604 |
| 2006/0098065 | A1* | 5/2006 | Maruyama et al. ......... 347/100 |
| 2009/0137825 | A1 | 5/2009 | Bauduin et al. |
| 2009/0325794 | A1 | 12/2009 | Woelk et al. |

FOREIGN PATENT DOCUMENTS

| DE | 101 09 892 A1 | 9/2002 |
|---|---|---|
| WO | WO 01/17673 A1 | 3/2001 |
| WO | WO 2004/085356 A1 | 10/2004 |
| WO | WO 2005/060610 A2 | 7/2005 |
| WO | WO 2007/136488 A2 | 11/2007 |

OTHER PUBLICATIONS

Ram et al., "Formation of stable Cu2O nanocrystals in a new orthorhombic structure" Materials Science and Engineering A 304-306 (2001) 805-809.*

(Continued)

*Primary Examiner* — Anthony J Zimmer
(74) *Attorney, Agent, or Firm* — Walter Ottesen P.A.

(57) ABSTRACT

A nanocrystalline supported or unsupported copper oxide with a residual carbon content of <10% and a BET surface area >95 m²/g. Further, a method for the production of a supported, or unsupported nanocrystalline copper oxide is disclosed, as well as the use thereof in catalysis, in particular in the steam reforming of methanol or in the hydrogenation of esters.

9 Claims, 1 Drawing Sheet

(56) References Cited

OTHER PUBLICATIONS

Carnes, C. et al, "Synthesis, Characterization, and Adsorption Studies of Nanocrystalline Copper Oxide and Nickel Oxide", Langmuir 2002, 18, pp. 1352-1359, published on the web Jan. 15, 2002.

Ram, S. et al, "Formation of stable Cu2O nanocrystals in a new orthorhombic crystal structure", Materials Science and Engineering A304-306 (2001) pp. 805-809, Elsevier Science B.V.

"3 Keramische Werkstoffe", excerpt from Brevier Technische Keramik, Fahner Verlag, Lauf a.d. Pegnitz, 4th Edition 2003.

Schloegl, R. et al, "Nanokatalyse: alter Wein in neuen Schlaeuchen oder etwas wirklich Neues?", Angew. Chem. 2004, 116, pp. 1656 to 1667.

Purnama, Herry, "Catalytic Study of Copper based Catalysts for Steam Reforming of Methanol", Dissertation Technische Universitaet Berlin 2003.

Schlander, Jan Henrik, "Gasphasenhydrierung von Maleinsaeuredimethylester zu 1,4-Butandiol, γ-Butyrolacton und Tetrahydrofuran an Kupfer-Katalysatoren", Dissertation Universitaet Karlsruhe (TH) 2000.

English language translation of the International Preliminary Report on Patentability dated Dec. 6, 2010 of international application PCT/EP2009/003883 on which this application is based.

\* cited by examiner

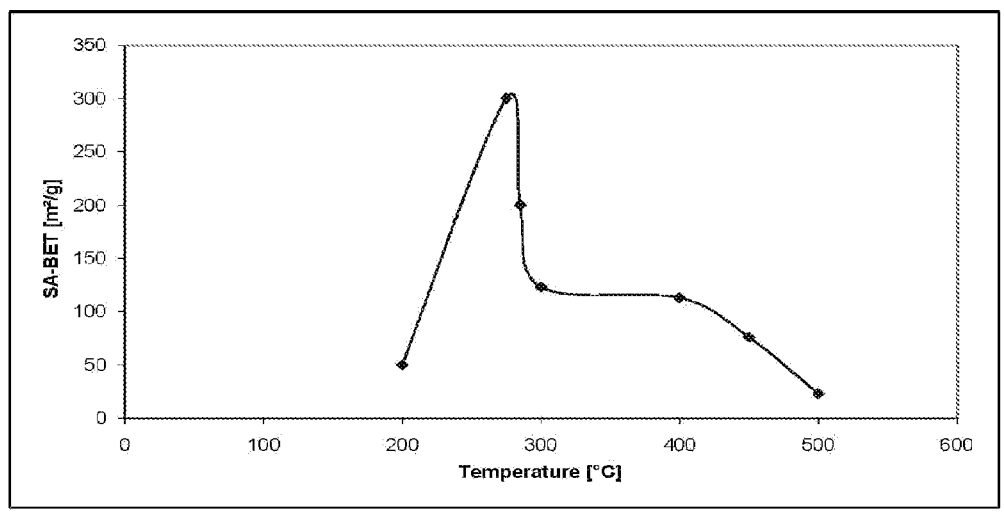

US 8,722,009 B2

NANOCRYSTALLINE COPPER OXIDE AND METHOD FOR THE PRODUCTION THEREOF

CROSS REFERENCE TO RELATED APPLICATIONS

This application is a divisional application of U.S. patent application Ser. No. 12/993,251, filed Feb. 8, 2011, which is, in turn, a national stage application of international patent application PCT/EP2009/003883, filed May 29, 2009, designating the United States and claiming priority from German application 10 2008 026 210.2, filed May 30, 2008, and the entire content of the above applications is incorporated herein by reference.

FIELD OF THE INVENTION

The present invention relates to nanocrystalline copper oxide as well as a method for the production thereof as well as the use thereof as catalyst or as catalyst constituent, in particular in the steam reforming of methanol or in the hydrogenation of esters.

BACKGROUND OF THE INVENTION

Metal oxides, in particular mixed metal oxides, have a wide technical field of use such as for example in ceramics, polymer additives, fillers, pigments, reactive surfaces, catalysts, catalyst constituents, etc.

In particular, metal oxides are also used as catalysts, for example for the production of oxidic catalysts, in particular in the production of methanol or for the hydrogenation of esters. Important variables when using oxides as catalysts, or as catalyst precursors, or constituents thereof are in particular the metal surface area of the reduced metals.

This can be influenced by the composition of the educt(s) through the targeted control of the production process (crystallization process) of oxides. Here, an important factor is in particular the crystallite size in various catalyst systems, which have been, examined in detail by R. Schlögl et al. (Angewandte Chemie, 116, 1626-1637, 2004).

A further important parameter is the BET surface area of these particles, wherein, as a rule of thumb, it is the case that, the higher the BET surface area is, the higher the catalytic activity is also. There have therefore always been attempts to obtain a catalyst powder with a high BET surface area. Furthermore, small metal crystallites contribute to a large and active total metal surface area and thus promote a high catalytic activity.

So-called nanocrystalline powders have also increasingly been considered for this purpose, as these appear to be particularly suitable for catalytic applications. However, production problems, often unsolved, occur here. A nanocrystal is a crystalline substance the size of which lies in the nanometer range or, in other words, a nanoparticle with a very largely crystalline structure.

Nanocrystalline oxide powders were previously usually produced either by chemical synthesis (for example by coprecipitation, etc.), by mechanical methods or by so-called thermophysical methods. However, the desired BET surface area in this case achieves values in the range for example of copper oxides (e.g. by calcining $Cu_2OH_2CO_3$) of only at most 60 to 90 $m^2/g$.

Typically, in the chemical synthesis of nanocrystalline powders, starting from so-called precursor compounds, a powder is synthesized by chemical reactions, for example by means of hydroxide precipitation, synthesis by hydrolysis with organometallic compounds and hydrothermal methods. The final structure of the nanocrystallites as typically achieved only after or during the calcining of the thus-obtained products.

Mechanical production methods are disadvantageous, as inhomogeneous particle-size distributions are mostly achieved or the particles become amorphous because of the pressure exerted on the particles and also the general particle size is too large to obtain the desired small metal crystallites after the reduction.

Thermophysical methods, such as are described for example in WO 2004/005184, are also known. These are used in particular in the industrial-scale production of fine crystalline silicon dioxide in which readily volatile silicon compounds are sprayed into an oxyhydrogen flame.

So-called plasma synthesis methods are further known in which the starting materials are evaporated in a plasma hot to 6000 kelvin, or CVD methods in which gaseous products are reacted.

For the steam reforming of methanol, $CuO/ZnO/Al_2O_3$-based catalysts are usually used which often lack long-term stability and have a high carbon content in the catalyst. The product often has very high undesired levels of C in addition to hydrogen and carbon dioxide. The specific parameters of these systems have been examined in detail by H. Purnama, Catalytic Study of Copper based Catalysts for Steam Reforming of Methanol (Berlin doctoral thesis 2003).

The use in the hydrogenation of esters, for example of maleic acid dimethyl esters to 1,4-butanediol, γ-butyrolactone and tetrahydrofuran on CU/ZnO catalysts, typically produced by coprecipitation has been examined in detail by Schlander, Karlsruhe doctoral thesis 2000, and CuO-based catalysts with high activity have been described.

In particular, the intermediate product 1,4-butanediol with two terminal hydroxyl groups from which for example polybutylene terephthalate, polyurethane and polyester can be obtained is also attractive. In addition to the production of polymers, 1,4-butanediol is also further processed to tetrahydrofuran and γ-butyrolactone. In all of these products, there is an increased need and thus also the necessity to make available further more active and more selective catalysts.

Further details on copper-containing catalysts, in particular based on Cu/ZnO, are to be found in the doctoral thesis by C. Olinger, Untersuchung der einstufigen Gasphasenhydrierung von Dimethylmaleat zur Herstellung von γ-Butyrolacton, 1,4-Butandiol und Tetrahydrofuran (Karlsruhe doctoral thesis, 2005).

WO 2007/136488 A2 describes copper oxide nanoparticle systems with shell-like structure, wherein the core of a nanoparticle consists of either $Cu_2O$ or a mixture, not specified in more detail, of metallic Cu and $Cu_2O$ and CuO is found on parts of the surface of such a nanoparticle. The thickness of the layer of CuO is approximately 1 nm.

This shell-like catalyst system can be supported or unsupported. The $Cu_2O$ nanoparticles were produced as specified in WO 2005/060610, wherein the nanoparticles are stabilized during the synthesis by ligands such as oleic acid or trioctylamine.

SUMMARY OF THE INVENTION

The object of the present invention was therefore to provide a nanocrystalline copper oxide which in particular also has a low carbon content as well as a high surface area in order to be used as catalyst constituent, in particular in the hydrogenation of esters or in the steam reforming of methanol, in supported or unsupported form.

The object is achieved by a nanocrystalline copper oxide with a BET surface area of >95 m$^2$/g.

According to the invention, the term "copper oxide" relates exclusively to the divalent copper oxide with the formula CuO.

The copper oxide according to the invention preferably has a residual carbon content of <10%, preferably offices than 5%, quite particularly preferably of <2%, relative to the total weight of the CuO.

The precise carbon content as conditional on the process parameters during production and also depends on the starting material.

Such a high BET surface area according to the invention (according to: Bruneuer, Emmett and Teller, determination according to DIN 66131 or 66132) has not previously been known for any other copper oxide. The high BET surface area also, in conjunction with the low carbon content, increases the catalytic activity and surprisingly also the selectivity of the nanocrystalline copper oxide according to the invention as catalyst or catalyst precursor in particular in the two above-named reactions.

Preferably, the BET surface area of the nanocrystalline copper oxide according to the invention lies in a range of from 95 to 300 m$^2$/g, and the particle size of the copper oxide according to the invention is smaller than 100 μm. Preferably, particle sizes according to the invention lie in the range of from 4 nm-20 nm for primary crystallites and in the range of from 20-100 cm for the secondary crystallites.

The supported CuO according to the invention has a BET surface area in the range of from 2-200 m$^2$/g.

In preferred developments of the invention, the nanocrystalline copper oxide is supported, wherein the support can comprise for example standard support materials, such as SiO$_2$, ZrO$_2$, bentonite, boehmite, montmorillonite, Al$_2$O$_3$, TiO$_2$, ZnO, MgSiOO, CaSiO$_y$, or standard aluminosilicates and mixtures thereof. Generally, however, for the purposes of the present invention, all ceramic materials which are usually described as "technical ceramic" and comprise both non-oxidic (e.g. carbides, nitrides, silicides, etc.) and oxidic materials (see e.g.: Brevier Technische Keramik, Fahner Verlag, Lauf a.d. Pegnitz, 4th edition 2003) can be used. The CuO is applied to the support by means of the method described in detail further below. BET surface areas in the range of from 2-200 m$^2$/g are observed for the supported CuO. Preferred systems are e.g. CuO/ZnO/Al$_2$O$_3$, CuO/ZnO, etc.

The particle size of the supported nanocrystalline copper oxide preferably lies in the range of from 50 to 2000 nm. Quite particularly preferably, the average particle size is 100-300 nm, quite particularly preferably 200 nm±10 mm. These values refer to the overall support particles/CuO system.

A catalyst based on the supported copper oxide according to the invention has a selectivity and reactivity in the hydrogenation of carboxylic acid alkyl esters 1.5 times higher than that of the catalysts described in EP 1 842 843 A1 or WO 2004/085356 A1, which can typically be obtained from Davy-Process Technology Ltd., England, under the name 85/1.

In Preferred developments, the Present invention also comprises a shaped body which contains nanocrystalline copper oxide or supported nanocrystalline copper oxide according to the invention. This shaped body is a shaped body known per se in the field of heterogeneous catalysis, such as can be present for example in the form of any three-dimensional bodies, such as tablets, rings, etc. The CuO can be applied in or to the shaped body for example by coating, spraying or by means of co-extrusion, etc. The basic material of the shaped body can typically be identical to the above-described support material.

The object of the present invention is further achieved by the provision of a method for the production of the nanocrystalline supported or unsupported copper oxide according to the invention which has as monomodal as possible a particle-size distribution, further a high BET surface area and avoids the above-named disadvantages of the state of the art. In particular, phase transitions of the product during the synthesis should be avoided and the particle size is to be adjustable. This object is achieved according to the invention by a method comprising the steps of a) the introduction of a copper starting compound into a reaction chamber by means of a carrier fluid, and wherein the copper starting compound is introduced into the reaction chamber in the form of a solution, slurry, suspension or in solid aggregate state, b) a thermal treatment of the copper starting compound in a treatment zone of the reaction chamber by means of a pulsating flow at a temperature of from 200 to 500° C., c) the formation of nanocrystalline copper oxide material, d) the discharge of the nanocrystalline copper oxide material obtained in steps b) and c) from the reactor.

Surprisingly, it was found that the crystallization process, in particular the size of the crystallites, can be controlled in targeted manner by the method according to the invention. This was 4-20 nm, preferably 8-20 nm. The BET surface area of the corresponding copper oxides obtained surprisingly lay in the range of from >95 m$^2$/g to 300 m$^2$/g.

These above-mentioned parameters are influenced in particular by the residence time of the solution/suspension or of the particles in the flame as well as by the reactor temperature. It was surprisingly further found that the method can be carried out at relatively to temperatures of from 200 to 500° C., particularly preferably from 250 to 350° C. This surprisingly runs counter to the statements in the state of the art, wherein in comparable method's temperatures of more than 700° C., and indeed up to 1400° C., have to be used to obtain crystalline products. Although e.g. a standard "static" calcining of Cu carbonate can also be carried out at 275° C., a BET surface area of Much less than 95 m$^2$/g is achieved.

The nanocrystalline copper oxide particles that form are prevented from agglomerating by the pulsating thermal treatment, wherein nanocrystalline product particles are then typically immediately transferred through the stream of hot gas into a colder zone of the reaction chamber, with the result that copper oxide crystallites with diameters of less than 20 nm can also often be obtained.

In the case of the copper oxides according to the invention, this leads to extremely high BET surface areas of more than 90 m$^2$/g, quite particularly preferably of up to 300 m$^2$/g. In the method according to the invention, the suspensions can advantageously be used within a very short period, typically within a few milliseconds, without further filtration and/or drying steps or without the addition of solvents.

A separate calcining step is also not necessary because this takes place in the reaction chamber in the one-step method according to the invention.

The nearly identical residence time of every individual particle in the homogeneous temperature field created by the method results in an extremely homogeneous end product with a very narrow monomodal particle distribution.

A device for carrying out the method according to the invention during production is known for example from DE 101 09 892 AI. Unlike the device described there and in the method disclosed there, the present method does not, however, require an upstream evaporation step in which starting materials must be heated to an evaporation temperature.

Furthermore, it is advantageous that in the method according to the invention the copper starting compound can be used as solution, slurry, suspension or even also as solid.

Although suspensions of corresponding starting compounds are particularly preferred, as these can subsequently be ground once more with the result that particles with a very small particle size of <10 μm can already be introduced into the reactor, this is not really necessary. It was observed that the use of a suspension ground previously (i.e. before introduction into the reactor) improves the BET surface area of the end products by approximately 10-20%, compared with non-pre-ground suspensions as starting product. Typically, the powder is thus ground before production of the suspension, but the thus-produced suspension can also be subjected again to a grinding process.

By means of the method according to the invention, the starting materials can typically be inserted direct in to the reaction chamber, more accurately into the combustion chamber, via a carrier fluid, in particular a carrier gas, quite particularly preferably an inert carrier gas, such as for example nitrogen, etc. Attached exhaust side to the reaction chamber is a resonance tube with a flow cross-section which is clearly reduced compared with the reaction chamber. The floor of the combustion chamber is equipped with several valves for the entry of the combustion air into the combustion chamber. The aerodynamic valves are fluidically and acoustically matched to the combustion chamber and the resonance tube geometry such that the pressure waves, created in the combustion chamber, of the homogeneous "flameless" temperature field spread pulsating predominantly in the resonance tube. A so-called Helmholtz resonator with pulsating flow forms.

Typically, the starting material is fed into the reaction chamber either with an injector or with a suitable two-component nozzle or in a Schenk dispenser.

Advantageously, a further precipitation step can be avoided when using solutions of corresponding salts, with the result that these are calcined direct in the reactor. The carrier fluid is preferably a carrier gas, such as for example air, nitrogen or air-nitrogen mixtures. A liquid, or even starting materials present already in solution can naturally also be alternatively used as fluid. The nature of the carrier fluid has an influence in particular on the residence time in the treatment zone. Thus, for example, suspensions and slurries of poorly soluble starting compounds, such as for example sulphates oxides, etc., can also be used direct according to the invention. Preferred starting materials are for example copper salts of an organic acid, a hydroxide, a hydroxocatbonate, a carbonate, nitrate or mixtures thereof or also simple copper-containing complexes.

Within the framework of the present invention, by organic acid is also meant carbonic acid (carbonate). Preferably, the salt of an organic acid comprises fewer than 9 carbon atoms. Glyoxalic acid, oxalic acid, citric acid or derivatives thereof and carbonic acid (carbonate) are quite particularly preferred in this case, whereby the carbon content in the end product is kept particularly low. So-called hydroxocarbonates are further preferred because of their ready accessibility and availability and costs.

In addition to the copper starting compound, further compounds can also advantageously be used in the method, for example silicates, zinc oxide, titanium oxide, magnesium silicate, calcium silicate, aluminium oxide, boehmite, zirconium oxide, aliminosilicates, etc. However, as already stated above, all ceramic materials which are usually described as "technical ceramic" and comprise both non-oxidic (e.g. carbides, nitrides, silicides, etc.) and oxidic materials (see e.g.: Brevier Technische Keramik, Fahner Verlag, Lauf a.d. Pegnitz, 4th edition 2003) can be used for this.

As a result of this, supported copper oxide catalysts can be obtained in a single step by means of the method according to the invention, as these are already deposited on the later support materials in the reactor. These are more typically added as suspension, either through a separate nozzle or mixed with the solution/suspension of the copper starting compound. The support material can, however, also be present in dissolved or peptized form.

Thus, catalytically interesting binary or polynary systems, such as e.g. $CuO/ZnO/Al_2O_3$, $CuO/ZnO$, etc., for example for the steam reformation of methanol can also be particularly easily obtained with the method according to the invention, as well as further complex catalyst systems based on the synergy of different metal oxides. Further soluble or insoluble compounds are added, wherein the further compounds are preferably selected from the group consisting of compounds of silicon, tin, magnesium, titanium, aluminium, zirconium, zinc as well as mixtures thereof. What was stated above for the copper starting compounds applies analogously to these compounds, the oxidic suspensions thereof or even the compounds in the form of solids can, of course, also be used in the method according to the invention.

By controlling the pulsation (regular or irregular or the duration and amplitudes of the pulsating thermal, treatment) as well as the residence time of the starting compound(s) in the treatment zone (typically of from 200 ms to 2 s), the particle size can also be adjusted. Typical preferred values are 2-300 ms and 1-40 Hertz.

After the thermal treatment, the nanocrystalline copper oxides or mixed oxides that have formed are then immediately transferred into a colder zone of the reaction chamber, if possible by means of the carrier fluid, with the result that they can be discharged in the colder zone. The yield of the method according to the invention is almost 100%, as all of the product that forms can be discharged from the reactor.

As already stated above, it was surprisingly found that oxides already present in solid form can also be used as starting materials which according to the invention are converted into nanocrystalline particles by the subsequent pulsating temperature treatment. This opens up a particularly wide field of use of the method according to the invention, as it is not necessary to select specific starting compounds, for example in relation to their solubility, evaporation, etc. Due to the low temperature which is used in the method according to the invention, the risk of decomposition and secondary reactions also decreases, for example in particular when using carboxylic acid derivatives which could result in impurities of the product. Furthermore, the energy balance when carrying out the method according to the invention is also very favourable, as the energy consumption is lower compared with conventional methods.

Typically, the method is carried out at a pressure between 15 and 40 bar.

The obtained copper oxide according to the invention is used in supported or unsupported form for example as catalyst in the steam reforming of methanol or in the hydrogenation of esters. Further uses are described for example in WO 2.004/085356 A1, to the full extent of the disclosure contents of which reference is made here. It can also be used as total oxidation catalyst or as catalyst for the oxidation of glyoxal.

Typically, the CuO is often reduced to metallic copper, e.g. by means of $H_2$, before being used in a catalytic reaction. In the present case it was observed that more than 60%, still preferably more than 80%, of the reducible copper oxide is again reduced to copper. This applies both to supported and to unsupported CuO.

Further fields of use are e.g. the use of the CuO obtained according to the invention a combustion catalyst in the micro-nitrogen determination carried out in the carbon dioxide-oxygen stream. Compared with the product customary in the trade with smaller surface area, the copper oxide according to the invention with high surface area has various advantages; a longer life of the tube contents and a substantial shortening of the time outlay necessary for the individual analyses are thus achieved.

Likewise, the CuO according to the invention can also be used as admixture/constituent of high-temperature superconductors or as alloying constituent in the production of special steels. The CuO according to the invention is further used as additive when colouring glasses and enamel. A further field of use is the use of the CuO according to the invention as catalyst in the desulphurization of crude oil. CuO can likewise be used as heat collectors in solar collectors, as fungicide/herbicide, and as fluxing agent in ceramic glazes.

In non-reduced form, it can also be used as adsorption agent, e.g. when removing arsenic from gas streams according to the teaching of U.S. Pat. No. 798,215.

Yet another use of the CuO according to the invention is e.g. the substitution of hopcalite $CuMn(Ag)(Co)O_x$ for room temperature CO oxidation, alone or in combination with $MnO_2$ or accompanied by addition of suitable promoters.

DESCRIPTION OF THE PREFERRED EMBODIMENTS OF THE INVENTION

The method according to the invention is described in more detail below using the embodiment examples as well as a figure which are, however, not to be considered as limiting.

The device used corresponded largely to that describe in DE 101 09 892 A1, with the difference that, as already explained above, the device used for carrying out the method according to the invention had no preliminary evaporator stage.

EXAMPLE 1

Solutions or suspensions of $Cu(NO_3)_2$, together with Al-containing support: materials, here bentonite (obtainable from Südchemie AG), were effected.
1. Production of Suspension:
  20 l water was placed in a sheet metal vessel. 11.51 kg Cu hydroxocarbonate (approximately 55% Cu) was added slowly accompanied by stirring. 3333 g raw clay (BE30) was then also added. The suspension was dispersed by means of Ultra-Turrax (15 min.). 45 l water was then added to the suspension. The suspension was vigorously stirred to avoid, a sedimentation. The synthesis was carried out analogously in the case of copper nitrate as starting material.
2. Injection into Fluidized Bed:
  The residence time of the powder in the fluidized bed was approximately 1-2 seconds. A 2-mm nozzle was used.

The procedure for unsupported CuO according to the invention did not include the addition of raw clay (bentonite). The results of BET measurements for CuO starting from a copper nitrate solution are shown in FIG. 1. There the EFT surface area is shown in relation to the process temperature. According to this, the maximum of the BET surface area is achieved between approximately 220 and 300° C. Similar curves were also obtained for CuO from solutions and suspensions of other precursor compounds, in particular (Cu(OH)$_2$.CuCO$_3$), with the result that the values from FIG. 1 can be applied generally.

As can further be seen from FIG. 1, the copper oxide according to the invention has a BET surface area of almost 300 m²/g a at a synthesis temperature of approximately 290° C. Up to a temperature of approximately 400° C., the BET surface area is still above the value of approximately 100 m²/g desired according to the invention, and then it decreases as the temperature: increases, 3. Variation in the Total Carbon Content A basic copper carbonate powder Cu(OH)$_2$.CuCO$_3$) with a copper content, or from 54% to 56% which was used in the form of an aqueous 15% suspension served as starting material in the present case.

The basic copper carbonate suspension was sprayed successively into the pulsating fluidized bed at different process temperatures by means of a two-component: nozzle with a feed quantity of 14 kg/h.

CuO according to the invention was obtained at different reaction or process temperatures in the range of from 250° C. to 500° C.

The total carbon content of the CuO was then examined by means of ICP-MS.

TABLE 1

Relationship between reaction temperature and the total carbon content of the CuO

| Sample Number | Process Temperature in ° C. | Total carbon content in % |
|---|---|---|
| 1 | 250 | 3.1 |
| 2 | 300 | 2.4 |
| 3 | 350 | 0.3 |
| 4 | 400 | 0.2 |
| 5 | 450 | 0.2 |
| 6 | 500 | 0.2 |

The radiographic analysis of CuO Samples 1 to 6 showed exclusively crystalline CuO reflexes.

As can be seen from Table 1, the total carbon content of the CuO is typically less than 3.1%. At process temperatures of between 400° C. and 500° C., it is actually only 0.2%. The optimum relationship between total carbon and BET surface area (FIG. 1) is thus achieved at a process temperature of approximately 350° C.

It is understood that the foregoing description is that of the preferred embodiments of the invention and that various changes and modifications may be made thereto without departing from the spirit and scope of the invention as defined in the appended claims.

The invention claimed is:
1. A method for the production of nanocrystalline copper oxide with a BET surface area >95 m²/g comprising:
  a) introducing a copper starting compound into a reaction chamber by means of a carrier fluid, wherein the copper starting compound is introduced into the reaction chamber in the form of a solution, a slurry, a suspension or in a solid aggregate state,
  b) subjecting the copper starting compound to pulsating thermal treatment in a treatment zone of the reaction chamber at a temperature of from 200 to 500° C.,
  c) forming a nanocrystalline copper oxide material, and
  d) discharging the nanocrystalline copper oxide material from the reactor.

2. The method according to claim 1, wherein the copper starting compound is provided as the suspension with an average particle size of <10 μm.

3. The method according to claim 2, wherein the average particle size is obtained by grinding the copper starting compound before producing the suspension.

4. The method according to claim 1, wherein the copper starting compound is used as the solution.

5. The method according to claim 1, wherein, as the copper starting compound, a compound selected from the group consisting of a copper salt of an organic acid, a hydroxide, a nitrate, a carbonate, and a hydroxocarbonate or mixtures thereof is used.

6. The method according to claim 5, wherein, as organic acid, an organic acid with fewer than 9 carbon atoms is used.

7. The method according to claim 6, wherein the organic acid is selected from the group consisting of glyoxalic acid, oxalic acid, and citric acid.

8. The method according to claim 1, wherein, in addition to the copper starting compound, further compounds are also used.

9. The method according to claim 8, wherein the further compounds are selected from the group consisting of compounds of silicon, tin, magnesium, titanium, aluminium, zirconium, and zinc and mixtures thereof.

* * * * *

UNITED STATES PATENT AND TRADEMARK OFFICE
CERTIFICATE OF CORRECTION

PATENT NO.         : 8,722,009 B2                                    Page 1 of 1
APPLICATION NO.    : 13/924144
DATED              : May 13, 2014
INVENTOR(S)        : H. Woelk et al.

It is certified that error appears in the above-identified patent and that said Letters Patent is hereby corrected as shown below:

On the Title page, under Related U.S. Application Data, at Item (62), please insert after "filed": -- on Feb. 8, 2011, now abandoned, which is a continuation of application No. PCT/EP2009/003883, filed on May 29, 2009. -- and delete "as application No. PCT/EP2009/003883 on May 29, 2009, now abandoned".

On the Title page, under ABSTRACT, at Item (57), fourth line, please delete "supported," and substitute -- supported -- therefor.

In the Specification

<u>In Column 1</u>:
Line 9: delete "12/993,251," and insert -- 12/995,251, -- therefor.
Line 28: delete "use" and insert -- use, -- therefor.
Line 42: delete "1626-1637," and insert -- 1628-1637, -- therefor.

<u>In Column 2</u>:
Line 3: delete "as" and insert -- is -- therefor.
Line 32: delete "CU/ZnO" and insert -- Cu/ZnO -- therefor.

Signed and Sealed this
Twenty-ninth Day of July, 2014

Michelle K. Lee
*Deputy Director of the United States Patent and Trademark Office*

UNITED STATES PATENT AND TRADEMARK OFFICE
CERTIFICATE OF CORRECTION

Page 1 of 2

PATENT NO.       : 8,722,009 B2
APPLICATION NO.  : 13/924144
DATED            : May 13, 2014
INVENTOR(S)      : H. Woelk et al.

It is certified that error appears in the above-identified patent and that said Letters Patent is hereby corrected as shown below:

On the Title page, under Related U.S. Application Data, at Item (62), please insert after "filed": -- on Feb. 8, 2011, now abandoned, which is a continuation of application No. PCT/EP2009/003883, filed on May 29, 2009. -- and delete "as application No. PCT/EP2009/003883 on May 29, 2009, now abandoned".

On the Title page, under ABSTRACT, at Item (57), fourth line, please delete "supported," and substitute -- supported -- therefor.

In the Specification

<u>In Column 1</u>:
Line 9: delete "12/993,251," and insert -- 12/995,251, -- therefor.
Line 28: delete "use" and insert -- use, -- therefor.
Line 42: delete "1626-1637," and insert -- 1628-1637, -- therefor.

<u>In Column 2</u>:
Line 3: delete "as" and insert -- is -- therefor.
Line 32: delete "CU/ZnO" and insert -- Cu/ZnO -- therefor.

<u>In Column 3</u>:
Line 10: delete "offices" and insert -- of less -- therefor.
Line 13: delete "as" and insert -- is -- therefor.
Line 17: delete "Bruneuer," and insert -- Brunauer -- therefor.
Line 31: delete "cm" and insert -- nm -- therefor.
Line 52: delete "mm" and insert -- nm -- therefor.
Line 61: delete "Preferred" and insert -- preferred -- therefor.
Line 61: delete "Present" and insert -- present -- therefor.

This certificate supersedes the Certificate of Correction issued July 29, 2014.

Signed and Sealed this
Twenty-third Day of September, 2014

Michelle K. Lee
*Deputy Director of the United States Patent and Trademark Office*

CERTIFICATE OF CORRECTION (continued)
U.S. Pat. No. 8,722,009 B2

In Column 4:
Line 36: delete "to" and insert -- low -- therefor.
Line 39: delete "method's" and insert -- methods -- therefor.
Line 43: delete "Much" and insert -- much -- therefor.
Line 58: delete "necessary" and insert -- necessary, -- therefor.

In Column 5:
Line 20: delete "in to" and insert -- into -- therefor.
Line 44: delete "solution" and insert -- solution, -- therefor.
Line 51: delete "hydroxocatbonate," and insert -- hydroxocarbonate -- therefor.
Line 67: delete "aliminosilicates," and insert -- aluminosilicates, -- therefor.

In Column 6:
Line 63: delete "2,004/085356 A1," and insert -- 2004/085356 A1, -- therefor.

In Column 7:
Line 6: delete "a" and insert -- as -- therefor.
Line 10: delete "advantages;" and insert -- advantages: -- therefor.
Line 25: delete "798,215" and insert -- 798,216 -- therefor.
Line 63: delete "EFT" and insert -- BET -- therefor.

In Column 8:
Line 6: delete "300 $m^2$/g a" and insert -- 300 $m^2$/g -- therefor.
Line 10: delete "temperature: increases," and insert -- temperature increases. -- therefor.
Line 12: delete "$Cu(OH)_2$. $CuCO_3$)" and insert -- $(Cu(OH)_2 \cdot CuCO_3)$ -- therefor.
Line 13: delete "content, or" and insert -- content of -- therefor.